United States Patent [19]

Martinez, Jr. et al.

[11] Patent Number: 4,771,996
[45] Date of Patent: Sep. 20, 1988

[54] MACPHERSON STRUT WITH FLOATING STRIKER PLATE

[75] Inventors: Guillermo Martinez, Jr., Lambertville, Mich.; Srinath Nandyal, Bloomingdale, Ill.

[73] Assignee: Maremont Corporation, Carol Stream, Ill.

[21] Appl. No.: 31,239

[22] Filed: Mar. 26, 1987

[51] Int. Cl.4 .................. B60G 7/02; B60G 11/00; F16F 7/00; F16F 9/00

[52] U.S. Cl. .................. 267/220; 267/153; 267/292; 188/321.11; 280/668

[58] Field of Search .............. 280/668; 267/220, 219, 267/35, 221, 34, 292, 293, 294, 153, 152, 140, 141, 33; 188/321.11

[56] References Cited

U.S. PATENT DOCUMENTS

| | | | |
|---|---|---|---|
| 4,200,307 | 4/1980 | Szabo | 280/668 |
| 4,397,452 | 8/1983 | Fouts | 267/220 |
| 4,434,977 | 3/1984 | Chiba et al. | 267/33 |
| 4,474,363 | 10/1984 | Numazawa et al. | 267/220 X |
| 4,477,061 | 10/1984 | Kawaura et al. | 267/220 |
| 4,482,135 | 11/1984 | Ishida et al. | 267/220 |
| 4,486,028 | 12/1984 | Tanahashi | 280/668 |
| 4,568,067 | 2/1986 | Iwata | 267/33 X |
| 4,618,130 | 10/1986 | Veglia | 267/153 |
| 4,673,192 | 6/1987 | Krehan et al. | 280/668 |

Primary Examiner—Douglas C. Butler
Attorney, Agent, or Firm—Allegretti, Newitt, Witcoff & McAndrews, Ltd.

[57] ABSTRACT

An improved MacPherson strut configuration for use in an automobile suspension system is disclosed. The strut includes a strut cylinder and a pressure cylinder having an upper end, and a piston with a piston rod extending from within the pressure cylinder and attached to the body of a vehicle. A jounce bumper is attached about the piston rod between the body and the upper end of the pressure cylinder, and a striker plate is secured about the piston rod between the jounce bumper and the end of the strut cylinder. In the preferred embodiment, the striker plate has a central bore providing an interface fit with a piston rod; it further includes lower parallel surfaces extending radially inward to a concave central portion of the plate that is concentric with and adjacent to the central bore. Also in the preferred embodiment, the striker plate is composed of an elastic polymer.

7 Claims, 3 Drawing Sheets

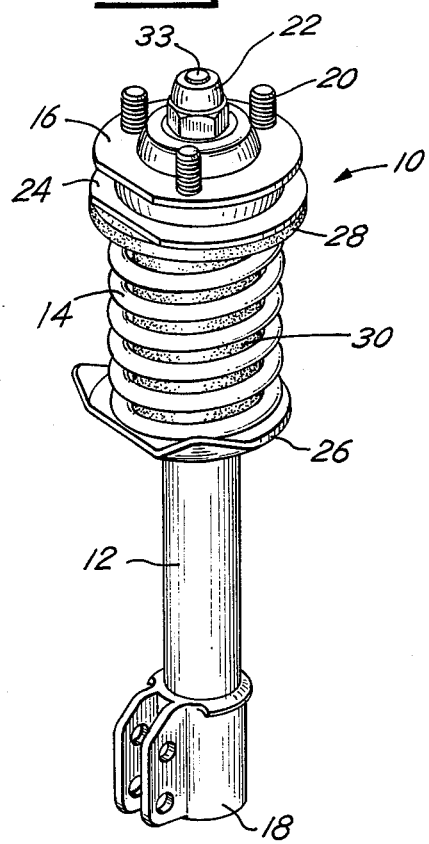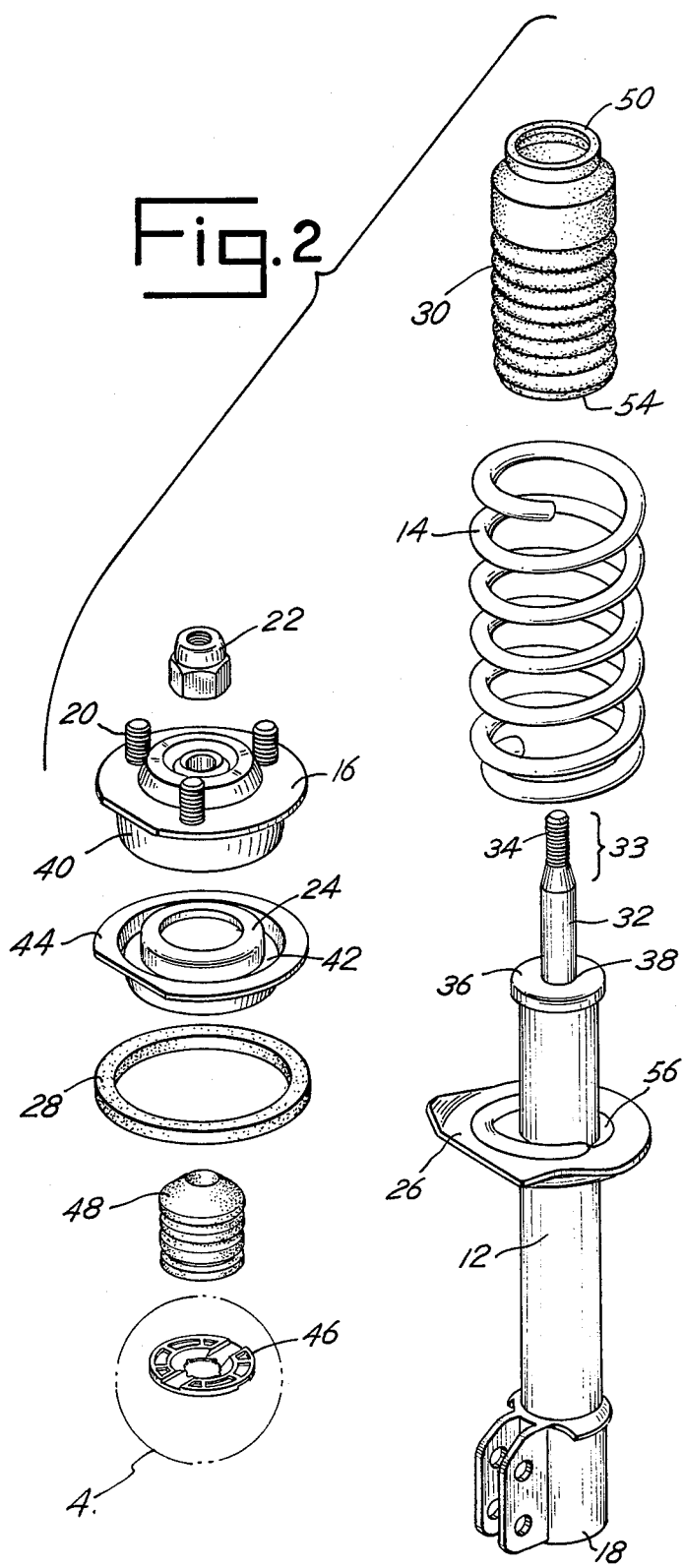

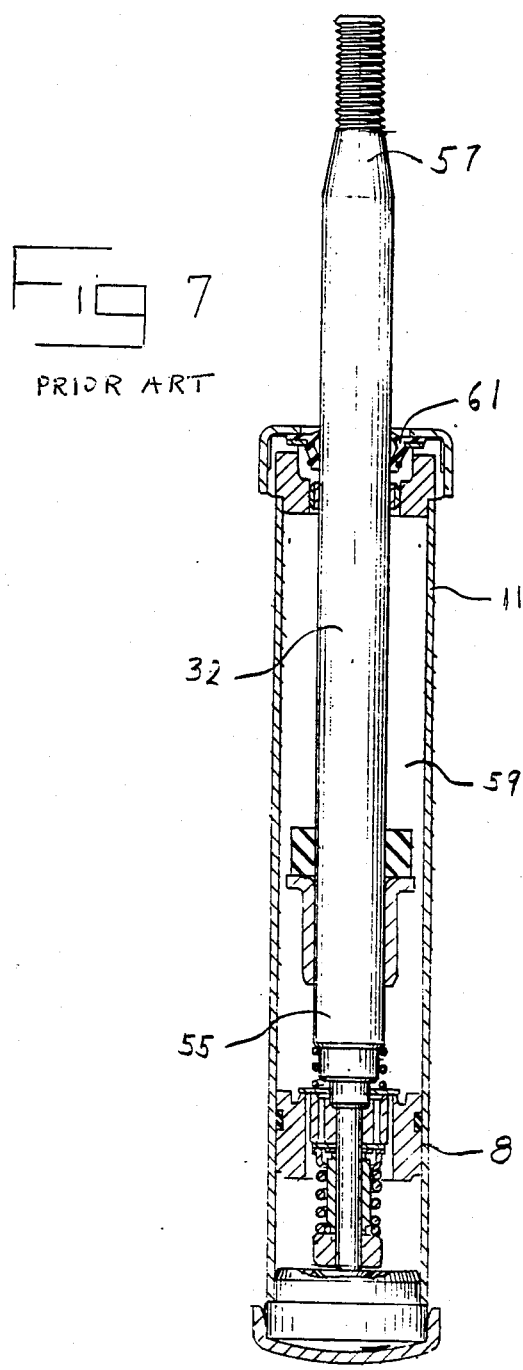

MACPHERSON STRUT WITH FLOATING STRIKER PLATE

BACKGROUND OF THE INVENTION

This invention relates to MacPherson struts, and more particularly, the invention relates to an improved MacPherson strut with a "floating" striker plate mounted on the piston rod of the strut.

MacPherson struts have become commonplace elements of the suspensions of modern automobiles and related vehicles. Typically, such structures are used in the vehicle's front or steering suspension to support a "sprung" mass (i.e., the automobile body) upon an "unsprung" mass (i.e., the automobile chassis). The advantages of MacPherson struts in such applications are numerous and wellknown to the persons having skill in the art.

MacPherson struts used in the prior art have typically included a shock absorbing pressure cylinder contained within an outer strut cylinder with an attached piston and piston rod. Absorption of shock is accomplished by movement of the piston through fluids contained in the pressure cylinder in a manner wellknown in the art. A piston rod, attached to the piston, extends from the upper part of the pressure cylinder and is normally connected to the sprung mass (the automobile body) through a flexible connection to that mass. The strut cylinder is normally attached to the vehicle chassis at the cylinder's lower end, resulting in the strut being connected between the sprung and unsprung masses.

All MacPherson struts, including prior art struts, provide some arrangement for compensating for jounce (substantial jolt) that occurs when the vehicle encounters a severe surface irregularity. Without adequate precautions, such jounce can produce an impact between the automobile body and the top of the strut cylinder. The result of that impact can be severe damage to the strut assembly and the piston rod seal.

The prior art typically addressed this problem by providing a strut arrangement configured to protect the upper end of the strut cylinder and rod seal assembly. Normally, the upper ends of prior art cylinders are constructed with a removable body nut through which the piston rod extends to reach the automobile body. The body nut is typically threaded so that it can be screwed into the strut cylinder. The body nut also retains the piston rod seal, which provides a seal against loss of fluid from the cylinder during movement of the piston rod through the nut. To prevent damage from jounce, the body nut often includes a striker plate at its top and a compression or jounce bumper positioned around the piston rod above the striker plate.

Prior art striker plates are normally made of steel and are welded to the top of the body nut. Such striker plates have a central bore that surrounds the piston rod. When a severe irregularity in the travel surface is encountered by the vehicle's wheels, damage to the body and strut is minimized; the steel striker plate and the jounce bumper (usually made of a compressible material such as rubber) absorb the impact and prevents metal to metal contact and damage. Striker plates in the prior art are also often constructed to prevent water and other contaminants such as sand or dirt particles from being forced into the rod seal between the seal and the piston rod. Such contaminants, if allowed into the seal, would cause fluid leakage from the pressure cylinder and would damage the piston rod surface. Striker plates therefore normally provide a channel or similar structure that allows expulsion of water or other contaiminants that become trapped within the central bore of the striker plate. Without such a channel, the jounce bumper can act as a cap and piston combination, and cause dirt to enter the seal of the pressure cylinder.

While effective in protecting a conventional strut from normal shocks, the conventional striker plate and jounce bumper arrangement is not ideal. Use of a steel striker plate adds weight to the unsprung mass of the car, and adds to the complexity of the manufacturing operation due to the need to weld the striker plate to the body nut. An improved plate and the strut configuration is therefore desirable to reduce cost and weight, and to decrease the quantity and complexity of the strut's assembly operation.

OBJECTS OF THE INVENTION

Accordingly, it is an object of this invention to provide a MacPherson strut for use between the sprung and unsprung masses in the vehicle in an arrangement that protects the strut from the effects of severe jounce.

It is also an object of this invention to provide such a MacPherson strut that is inexpensive to manufacture.

A further object of this invention is to provide a MacPherson strut with a striker plate assembly that is light in weight.

Yet another object of this invention is to provide a MacPherson strut that includes a striker plate configuration protecting the seal between the piston rod and the pressure cylinder from impact with the compression or jounce bumper.

Still a further object of this invention is to provide a MacPherson strut and striker plate arrangement that allows for drainage of water and contaminants from the striker plate away from the seal of the piston rod with the pressure cylinder.

Another object of this invention is to minimize manufacturing cost and complexity.

Yet a further object of this invention is to provide a MacPherson strut and striker plate arrangement that allows the striker plate to "float" to the top of the piston rod.

SUMMARY OF THE INVENTION

These and other objects of the invention are achieved by providing a MacPherson strut assembly with an improved floating striker plate. The strut assembly is mounted on the suspension system of a vehicle between the vehicle's sprung and unsprung masses. The strut includes a pressure cylinder with an upper end, and a piston having a piston rod mounted in the pressure cylinder and slidable in that cylinder. The piston rod's inner end is connected to the interior of the pressure cylinder. The outer end of the piston rod, extending to the exterior of the pressure cylinder, flexibly connects to the vehicle's sprung mass. A jounce bumper is attached about the piston rod's outer end, and a striker plate is secured about the piston rod between the jounce bumper and the upper end of the pressure cylinder. In the preferred embodiment, the striker plate has a central bore providing an interference fit with the piston rod, and is composed of a polymer, such as acetal copolymer. Also in the preferred embodiment, the striker plate has lower parallel surfaces extending radially inward to a concave central portion concentric with and adjacent to the striker plate's central bore.

BRIEF DESCRIPTION OF THE DRAWINGS

The preferred embodiment of the present invention is the strut configuration disclosed in the detailed descriptions and drawings. The drawings include six figures illustrating the prior art and the preferred embodiment wherein like reference numerals denote the same elements in different drawings. The figures are briefly described as follows.

FIG. 1 a perspective view of an assembled MacPherson strut showing the strut, piston rod and jounce bumper arrangement.

FIG. 2 is an exploded perspective view of the strut of FIG. 1 showing the position of the striker plate within the strut assembly.

FIG. 7 is a side-cross sectional view showing the interior of a MacPherson strut suitable for use with the invention.

Figure 3:
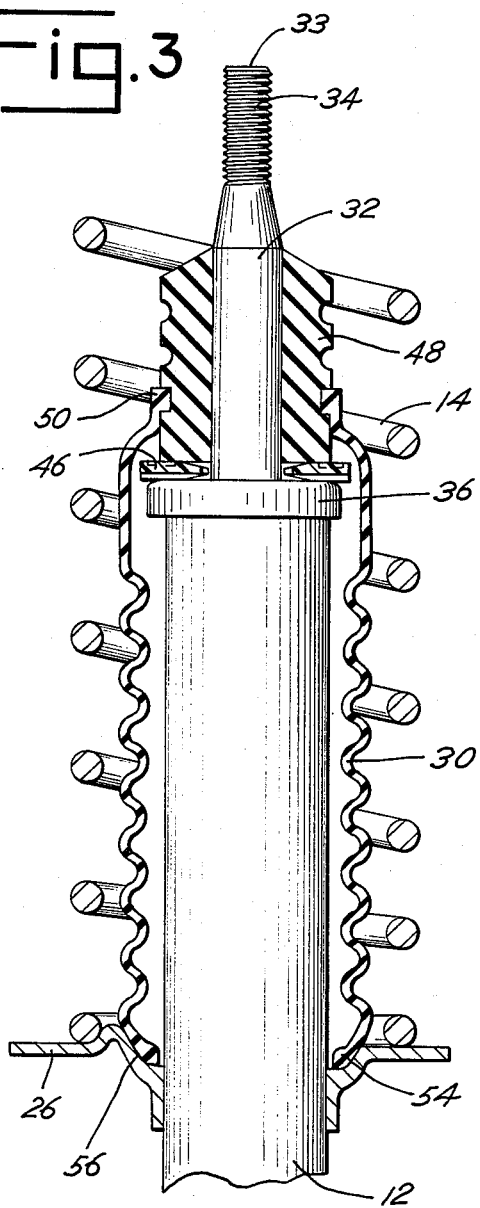
FIG. 3 is a side cross sectional view of the preferred embodiment of the present invention showing the upper portion of the improved strut.

In the following detailed description, directional term such as upper, lower, and the like are used to relate the invention to the normal orientation of a strut when installed as part of an automobile suspension. Terms of this type are used for the convenience of a person having ordinary skill in the art, and are not intended to limit the scope of any patent issuing on the present invention, unless they are expressly included in the claims.

DETAILED DESCRIPTION OF THE PREFERRED EMBODIMENT

Referring now to the drawings and more particularly to FIGS. 1, 2, 3 & 7, the invention is an improved MacPherson strut assembly 10. The assembly includes a piston 8 mounted in a pressure cylinder 11, a strut cylinder 12, and a spring 14 mounted about the upper end of the strut cylinder 12. The arrangement for attachment of the MacPherson strut to the motor vehicle is also illustrated in FIG. 1, which shows the strut's upper support housing 16 and lower mounting clevis 18. The upper support housing 16 is used to attach the strut assembly to the automobile frame (not shown), usually by insertion of frame bolts 20 through corresponding openings in the automobile frame and securing the bolts to the frame with nuts (not shown). The strut includes a piston rod 32 with a top end 33. The upper support housing is attached to the MacPherson strut by a piston rod nut 22 that is threadable onto the top end 33. The spring 14 is secured between the lower support housing 24 and the spring seat 26. In the preferred embodiment, the spring 14 rests against a spring gasket 28 which in turn rests against the lower side of the lower supporting housing 24. The upper end of the assembly is protected against ingress of dirt, grime and other contaminates by a dust cover 30 that is mounted within the spring 14.

Referring in particular to FIGS. 2 and 3, the details of the assembly are shown, including the position and interaction of the striker plate with respect to the piston rod and compression bumper. The preferred embodiment of the strut assembly includes a threaded portion 34 on the top end 33 of the piston rod 32. The threaded portion is matable with the piston rod nut 22. The strut cylinder 12 preferably has a cylinder cap 36 at the intersection of the piston rod 32 with the strut cylinder. The pressure cylinder 11 is filled with a fluid, and a piston 8 is connected to the piston rod such that the piston 8 and piston rod move vertically with respect to the pressure cylinder and the piston rod moves through the opening 38 in the cylinder cap 36.

The preferred embodiment further includes an upper support housing 16 having a circular flange 40 that is matable with a recess 42 in the lower support housing. As best illustrated by FIGS. 1 and 2, the spring gasket 28 is adapted to rest against a rim 44 on the lower support housing fitting around the recess 42.

The preferred embodiment of the invention also includes a striker plate 40 that is mounted about the piston rod 32. A compression bumper 48 is also mounted about the piston rod 32 with the striker plate 46 positioned on the rod between the cylinder cap 36 and the compression bumper 48. The compression bumper is preferably made of a compressible elastic material, such as rubber or synthetic substitute.

As best illustrated in FIG. 3, the dust cover 30 is configured to be matable with both the outer body 12 of the strut cylinder and the compression bumper 48. To that end, the dust cover 30 includes a clamping rim 50 at its upper end that is matable with a groove 52 in the compression bumper 48. The inner diameter of the lower end 54 of the dust cover is the same diameter as the outer body of the strut cylinder 12 and smaller than the diameter of the cylinder cap 36.

The interior configuration of a typical MacPherson strut suitable for use with the invention is illustrated in FIG. 7. Such a MacPherson strut has a piston 8 attached to the piston rod 32 mounted within a pressure cylinder 11. The piston rod 32 has an inner end 55 and an outer or upper end 57. The interior of the pressure cylinder 59 contains the internal mechanisms of the MacPherson Strut, including the elastomeric seal 61 between the piston rod 32 and the pressure cylinder 11.

Figure 4:
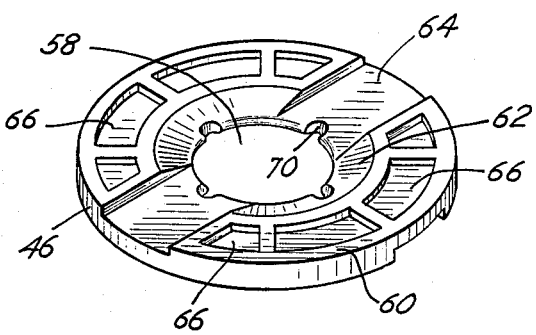
FIG. 4 is a perspective view of the striker plate used in the preferred embodiment of the invention.
Figure 5:
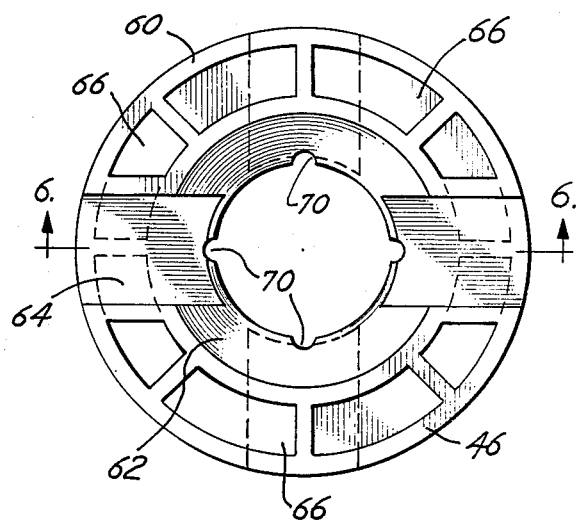
FIG. 5 is a top plan view of the striker plate of FIG. 4 as used in the preferred embodiment of the invention.
Figure 6:
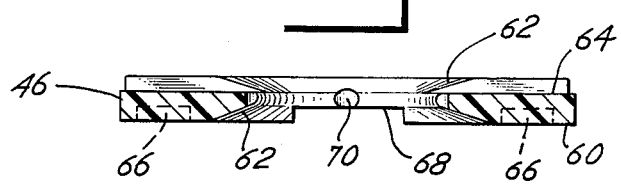
FIG. 6 is a side cross sectional view of the striker plate of FIGS. 4 and 5.

Details of the preferred embodiment of the striker plate are shown in FIGS. 4–6. The striker plate is preferably configured as a disk having a central bore 58 that is matable with the outside diameter of the piston rod 32. In the preferred embodiment, the striker plate is attached on the piston rod with a force or interference fit that nevertheless allows sliding movement of the striker plate 46 along the exterior of the piston rod 32. To allow such movement, the thickness of the striker plate is made to be less at the central bore 58 that at the rim 60. The central bore 58 is preferably concentric with the circle defined by the rim of the disk. The disk is generally flat, but the central portion 62 is concave on both sides to allow a reduced thickness in that vicinity.

The preferred embodiment of the striker plate is also configured to reduce the amount of comtaminants that can enter into the strut cylinder and the cylinder cap opening 38. The interference fit between the striker plate 46 and the piston rod 32 served to scrape dirt, grime and other contaminants off the piston rod onto the surface of the disk. In the preferred embodiment, the striker plate 46 includes an upper slot 64 and a lower slot 68 that functions to channel and permit ejection of debris that accumulates on the striker plate. In the preferred embodiment, the upper and lower slots are perpendicular to each other to minimize the strength loss resulting from the reduced thickness of the striker plate.

The striker plate is also configured with a variety of indentations 66 on both its upper and lower side. Those indentations reduce the quantity of material used in fabricating the striker plate; the indentations also increase the strength of the striker plate by providing a geometry with more "corners" that increase the plate's resistance to bending.

The preferred embodiment of the striker plate also incorporates a series of four notches 70 in the central bore 58. The notches ease both attachment of the striker plate onto the piston rod 32 and the movement of the piston rod in the central bore during the compression motion of the piston in the pressure cylinder.

The preferred embodiment of the strut assembly, including the preferred striker plate, combine to provide protection for the cylinder cap 36 during jounce. During full compression, the cylinder cap 36 contact the striker plate 46 and forces that plate firmly against the bottom of the compression bumper 48. Because the striker plate is held by an interference fit onto the piston rod 32, the striker plate remains against the compression bumper even during the rebound stroke when the pressure cylinder falls relative to the piston rod. Only under unusual circumstances will the striker plate move relative to the piston rod, except during assembly of that plate onto the rod. However, the striker plate "floats" in comparison to the prior art, since the striker plate is not an integral part of the cylinder cap 36.

The striker plate may be manufactured out of any suitable, relatively rigid material, including steel and rubber. In the preferred embodiment, however, the striker plate is composed of a stiff polymer material, preferably an acetal copolymer.

While the preferred embodiment of the present invention has been set forth in the above detailed description, it is to be understood that the preferred embodiment is only an example of the invention. Other modifications may be used without departing from the scope of the present invention, and the invention is limited only by the following claims, including equivalence of elements of the claims where appropriate.

We claim:

1. An improved strut assembly of the kind used in a vehicle suspension system on a vehicle having sprung and unsprung masses, with the strut being connected between the sprung and unsprung masses, the strut assembly comprising, in combination:
   a pressure cylinder;
   a strut cylinder surrounding and spaced radially outwardly of the pressure cylinder and having an upper end with a cap;
   a piston having a piston rod with an inner and an outer end, the piston being suitable within the pressure cylinder, the piston rod further being connected to the piston at the piston rod's inner end in the interior of the pressure cylinder, with the piston rod's outer end slidably extending to the exterior of the pressure cylinder at its upper end and flexibly connected to the sprung mass;
   a jounce bumper attached about the piston rod's outer end; and
   a striker plate secured about the outer end of the piston rod intermediate the pressure cylinder's upper end and jounce bumper, the striker plate having a central bore adapted to fit around the piston rod, the striker plate also having lower parallel surfaces extending radially inward to a concave central portion that is concentric with and adjacent the central bore, whereby the strut cylinder's cap is protected from contact with the jounce bumper during full jounce motion of the vehicle suspension.

2. An improved strut assembly as claimed in claim 1, wherein the upper and lower surfaces of the striker plate have radially extending channels formed therein to provide discharge passages for water and small particles of contaminants that may collect about the central bore and above the pressure cylinder's upper end.

3. An improved strut assembly as claimed in claim 1, wherein the striker plate is molded of a polymer composition.

4. An improved strut assembly as claimed in claim 1, wherein the central bore of the striker plate provides an interferences fit with the outside of the piston rod.

5. An improved strut assembly of the kind used in a vehicle suspension system on a vehicle having sprung and unsprung masses, the strut assembly comprising, in combination:
   a pressure cylinder;
   a strut cylinder enclosing the pressure cylinder;
   a piston having a piston rod with an inner and an outer end, the piston being slidable within the pressure cylinder and the piston rod being connected to the piston at the piston rod's inner end in the interior of the pressure cylinder, the piston rod's outer end slidably extending to the exterior of the strut cylinder and being flexibly connected to the sprung mass;
   a fluid tight elastomeric seal between the piston rod and the pressure cylinder at the exit of the piston rod from the cylinder;
   a jounce bumper attached about the piston rod's outer end; and
   a striker plate secured about the outer end of the piston rod intermediate the elastomeric seal and jounce bumper the striker plate having a central bore providing an interference fit with the piston rod, the striker plate also having lower parallel surfaces extending radially inward to a concave central portion that is concentric with and adjacent the central bore, whereby the elastomeric seal is protected from contact with and damage by the jounce bumper during full jounce motion of the vehicle suspension.

6. An improved strut assembly of the kind used in a vehicle suspension system on a vehicle having sprung and unsprung masses, with the strut being connected between those masses, the strut assembly having a strut cylinder and a pressure cylinder with an upper end, having a piston rod having an inner and an outer end, the piston being slidable within the pressure cylinder and connected to the piston at the piston rod's inner end in the interior of the pressure cylinder, the piston rod's outer end slidably extending to the exterior of the pressure cylinder at its upper end and being flexibly connected to the sprung mass, the assembly also including a jounce bumper attached about the piston rod's outer end between the sprung mass and the strut cylinder's upper end, wherein the improvements comprises:
   a striker plate secured about the outer end of the piston rod intermediate the cylinder's upper end and jounce bumper, whereby the strut cylinder's upper end is protected from contact jounce bumper during full jounce motion of the vehicle suspension.

7. An improved strut assembly as claimed in claim 6, wherein the striker plate further comprises a central bore providing an interference fit with the piston rod, and lower parallel surfaces extending radially inward to a concave central portion that is concentric with and adjacent the central bore.

* * * * *